United States Patent [19]
Villevieille et al.

[11] Patent Number: 5,543,802
[45] Date of Patent: Aug. 6, 1996

[54] POSITION/NAVIGATION DEVICE AND METHOD

[75] Inventors: Jean-Marc Villevieille, Palatine; Tom Tischhauser, Hawthorn Woods, both of Ill.

[73] Assignee: Motorola, Inc., Schaumburg, Ill.

[21] Appl. No.: 24,596

[22] Filed: Mar. 1, 1993

[51] Int. Cl.$^6$ .............................. G01S 5/02; G01S 5/04; G01C 21/00

[52] U.S. Cl. ..................... 342/357; 342/443; 364/444; 364/449

[58] Field of Search ........................ 342/419, 443, 342/357; 364/444, 448; 340/995

[56] References Cited

U.S. PATENT DOCUMENTS

| | | | |
|---|---|---|---|
| 4,242,731 | 12/1980 | Mizote et al. | 364/436 |
| 4,563,685 | 1/1986 | Matsumoto et al. | 340/995 |
| 5,146,231 | 9/1992 | Ghaem et al. | 342/419 |
| 5,173,709 | 12/1992 | Lauro et al. | 342/443 |
| 5,231,584 | 7/1993 | Nimura et al. | 364/444 |
| 5,257,195 | 10/1993 | Hirata et al. | 364/449 |
| 5,270,936 | 12/1993 | Fukushima et al. | 364/444 |

OTHER PUBLICATIONS

U.S. Ser. No. 07/751,390 Ghaem Aug. 26, 1992.

*Primary Examiner*—Gregory C. Issing
*Attorney, Agent, or Firm*—Phillip H. Melamed

[57] ABSTRACT

A position/navigation device (10) and method is disclosed wherein a waypoint apparatus (11–14, 18, 43) sequentially designates and stores a continuous ordered sequence of n waypoints corresponding to positions of the device (10). Route and route reversal apparatus, (11–14, 18, 44) selects the stored sequence of n waypoints as a group without designating individual waypoints and forms a reverse route by reversing the order of the stored waypoints. Navigation means (14, 15, 18, 45) provides navigation information to an operator of the device (10) for following the reverse route to each of the n waypoints.

18 Claims, 2 Drawing Sheets

POSITION/NAVIGATION DEVICE AND METHOD

FIELD OF THE INVENTION

The present invention relates to the field of position/navigation devices and methods. More particularly, the present invention is directed to such devices and methods used for route determination/navigation.

BACKGROUND OF THE INVENTION

Prior position/navigation devices exist in which GPS (Global Positioning System) information is received from satellites to determine the position of a movable GPS receiver provided as part of a position/navigation device. Such prior devices have had the ability to store a plurality of waypoints wherein these waypoints are stored by actuation of manual controls of the position/navigation device when the device is at a position the location of which is desired to be stored as a waypoint. In addition, such devices also have the ability to store as a waypoint any position location wherein the operator of the device can specify the position location to be stored by specifying either the longitude and latitude of that position or other position identifying information. Such prior position/navigation devices also generally have the ability to provide navigation information to any specified location from the device's present location by providing direction and distance information to the specified location through the use of GPS receiver information which identifies the device's present position. Such devices are well known and some examples of similar GPS navigation devices are described in U.S. Pat. Nos. 5,146,231 and 5,173,709 and copending U.S. patent application Ser. No. 07/751,390, filed Aug. 26, 1992 and entitled, "Guidance Device" all assigned to the same assignee as the present invention.

In prior position/navigation devices, the device operator can select a plurality of individual waypoints and essentially create a route such that the device will provide sequential navigation information so as to navigate through the specified sequence of waypoints. However, prior devices implement this by requiring the individual designation of each waypoint which is to form the desired route when the route is created. This complicates the creation of routes and typically requires many individual key strokes by the device operator, as well as having the device operator remember the exact sequence of previously stored waypoints that he desires to follow. While such systems provide substantial flexibility with regard to specifying any desired route, they ignore a basic need of position/navigation devices in that they fail to provide a rapid and easy method and apparatus for essentially implementing a backtrack function in which it is desired to substantially retrace the movement of the navigation device. While prior GPS navigation devices have enabled the operator to designate a beginning location as a stored waypoint, often called the start or home waypoint, when it is desired to return to that waypoint, most of the time the navigation device will merely direct the person in the exact direction towards that waypoint ignoring the fact that physical barriers such as gullies, ravines or mountains my prevent direct travel to the home or start location from the navigation device's present position.

What is needed is an easy to implement apparatus and method to allow the operator of a navigation device to substantially backtrack his exact path back to a beginning or start location. This will ensure that the operator of the navigation device does not encounter physical barriers on his way back to the home location if those barriers were not encountered previously. In other words, a hiker may wander off into the woods and travel around an obstacle such as a gully or a ravine unknowingly. If he only is directed towards his base camp by a direction finder that points towards the original start location, he may never be able to get back to base camp. Prior systems have allowed a user to store a large number of individual waypoints. Thus it is theoretically possible for the operator of the prior navigation devices to store a large number of waypoints and then attempt to construct a reverse route by selecting different ones of those waypoints. However, this requires a very large number of key strokes and the ability of the operator to remember which waypoints have been designated and what their designations were, as well as the order in which those waypoints were designated, so that he can call them up and put them into a route while reversing their order. Obviously this is not suitable if a rapid return to a home or start location is desired while implementing a minimum number of actuations of manual controls. Therefore an improved route designation and navigation function is needed for position/navigation devices.

SUMMARY OF THE INVENTION

A position/navigation device and corresponding method is described herein. The navigation device comprises: waypoint means for sequentially designating and storing a continuous ordered sequence of a plurality of n positions of said position/navigation device as said device is sequentially located in each of said positions, said sequence of positions stored as a continuous ordered sequence of n waypoints; route and route reversal means for selecting said stored sequence of n waypoints, as a group without designating individual waypoints, to form a route indicative of prior position movement of said position/navigation device and for creating a reverse route by reversing the order of said n stored waypoints; and navigation means for providing navigation information for following said reverse route to each of said n waypoints. A corresponding method is also disclosed. Additional features and advantages of the present invention are more fully described in the subsequent detailed description of the preferred embodiment of the present invention.

BRIEF DESCRIPTION OF THE DRAWINGS

The present invention can be better understood by reference to the drawings in which.

Description of the Preferred Embodiments

Figure 1:
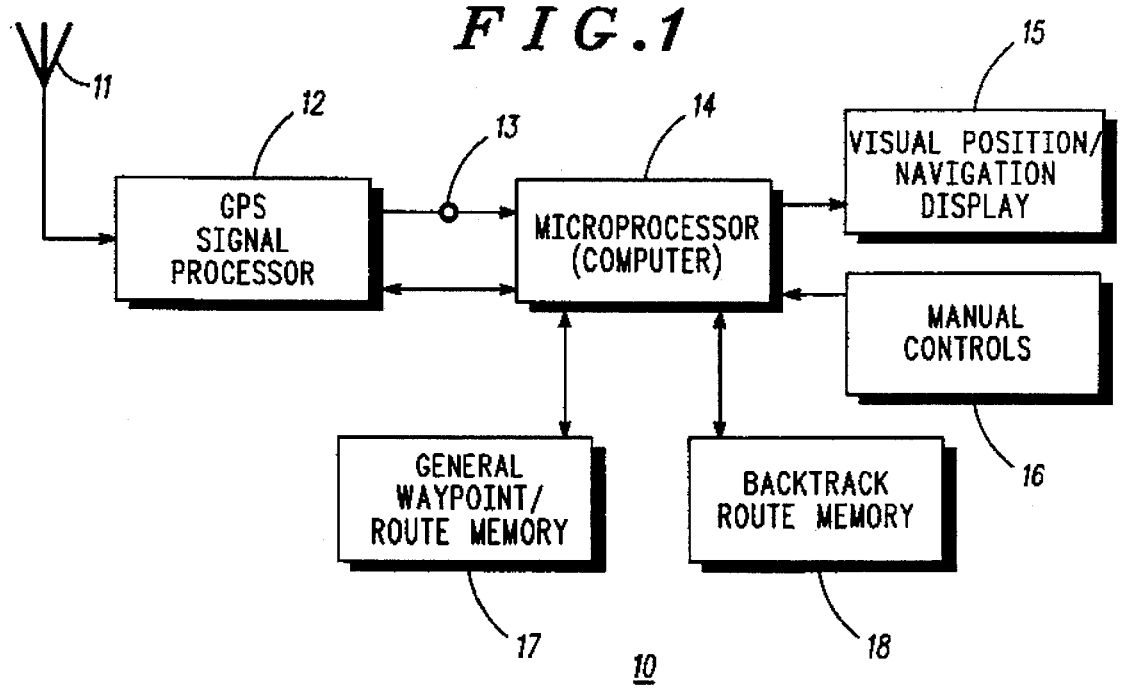
FIG.1 is a schematic diagram of a position/navigation device constructed in accordance with the present invention.

Referring to FIG. 1, a schematic diagram of a position/navigation device 10 is illustrated. The device generally utilizes GPS receiver information to determine a physical location of the device. Navigation information is visually provided by the device so as to provide navigation information from the present location of the device to any specified stored waypoint or position wherein the device may store its originating position as a waypoint or destination. A key feature of the device 10 is that it implements a backtrack route function without requiring the individual designation of a plurality of waypoints, and the manner in which this is implemented will now be described.

The position/navigation device 10 includes an antenna 11 which provided GPS information signals to a GPS signal processor circuit 12 that provides GPS position information at a position information terminal 13. The elements 11 through 13 correspond to conventional GPS receivers and GPS position devices in which GPS satellite information is processed so as to determine the exact location, in longitude and latitude, of a GPS receiver which in this case would correspond to the physical location of the antenna 11. It is contemplated that all of the elements shown in FIG.1 for the position/navigation device are contained within a single housing such as shown in FIG.2.

The GPS position information at terminal 13 is provided as an input to a microprocessor or computer 14. The microprocessor 14 provides visual position/navigation display information to a visual display 15. The microprocessor 14 is responsive to the actuation of manual controls 16 which are schematically illustrated in FIG. 1 as a block. In addition, the microprocessor 14 can store general waypoint designations and route designations, comprising a plurality of waypoints, in a general memory location 17, and such information can be retrieved by the microprocessor 14 from this general memory location. In addition, preferably a separate backtrack route memory location 18 is provided in which up to 10 waypoints are 10 automatically stored wherein these waypoints correspond to the 10 most recent positions of the device 10 at which time manual controls, which are part of the manual controls 16, have been actuated to designate positions for storing as waypoints.

Figure 2:
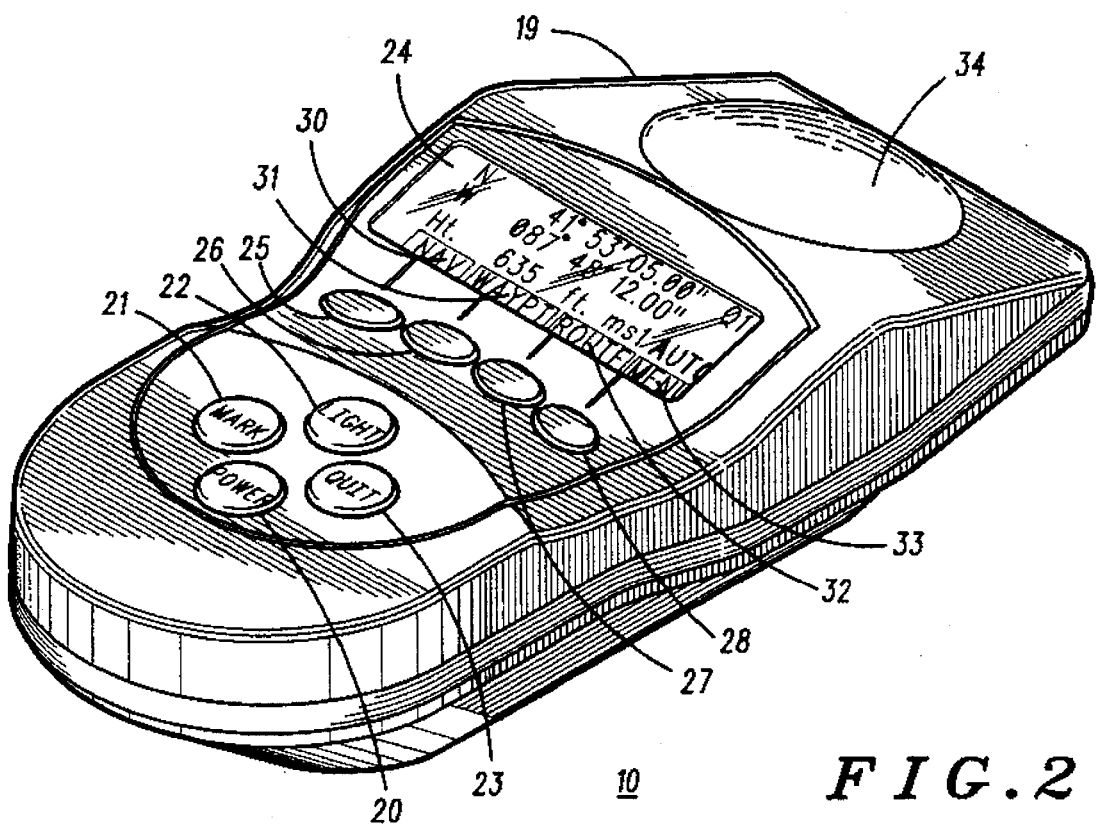
FIG.2 is a perspective view of the position/navigation device schematically illustrated in FIG.1.

Referring now to FIG.2, a perspective view of the position/navigation device 10 is illustrated and corresponds to the Traxar™ GPS navigation product currently marketed by Motorola, Inc. In FIG.2, the device 10 has a housing 19 and the manual controls 16 include a plurality of 4 dedicated manual controls 20 through 23. Manual control 20 is a power on/off pushbutton providing selective power to the electronics of the device 10 and therefore implementing an on/off function for the device. Manual control 22 merely selectively provides backlighting for an LCD display 24 of the device 10 which corresponds to the visual display 15 shown in FIG.1. A dedicated manual control pushbutton 21 implements a "mark" function which generally corresponds to a request to the microprocessor 14 for obtaining position information which may correspond to the present location of the device 10. A dedicated pushbutton 23 is used to selectively change device operation modes and the functions of a plurality of 4 additional nondedicated pushbuttons 25 through 28 which are shown in FIG.2. The function of each of the pushbuttons 25–28 varies in accordance with what position and/or navigation mode or other mode is being implemented by the device 10. The identity of what function is to be implemented by actuation of any of the pushbuttons 25 through 28 is indicated by a series of function labels 30 through 33 that are provided as part of the visual display 24. The antenna 11 in FIG. 1 is positioned within the housing 19 in the area designated by reference number 34.

Essentially, the pushbuttons 25 through 28 implement various functions depending upon what mode of operation the device 10 is in. The functions implemented by the pushbutton 25 through 28 are designated by the function labels 30 through 33 wherein these labels are altered by the microprocessor 14 in accordance with the mode of operation of the device 10. Thus, the labels 30–33 provide a variable menu type designation for the manual controls 25–28. Providing such multiple function keys and providing such visual labels that designate the functions of these keys in accordance with various operational modes is known for many prior devices in which multiple uses of a plurality of manual controls is desired wherein for different modes of operation actuation of each of the controls is to implement a different function. This type of feature just minimizes the total number of individual manual controls which are required. This represents a preferred way of providing the device 10 with a minimum number of actual manual controls while still providing a large number of functions selectable by the device 10.

It is contemplated that when it is desired to navigate from the present position of the device 10 to a previously stored waypoint, which may be indicative of a prior position of the receiver 10, the display 24 will indicate the proper direction towards that prior stored waypoint as well as the distance to the prior stored waypoint. Conventional GPS navigation devices also implement such a function wherein some of the GPS devices previously referred to in the Background section of this document also provide such navigation information. Details of this type of communication of navigation information to the operator of the device 10 are well known and therefore will not be explained in detail.

The operation of the device 10 will now be explained in connection with the flowchart in FIG.3 which illustrates how the microprocessor 14 controls the operation of the position/navigation device 10.

Figure 3:
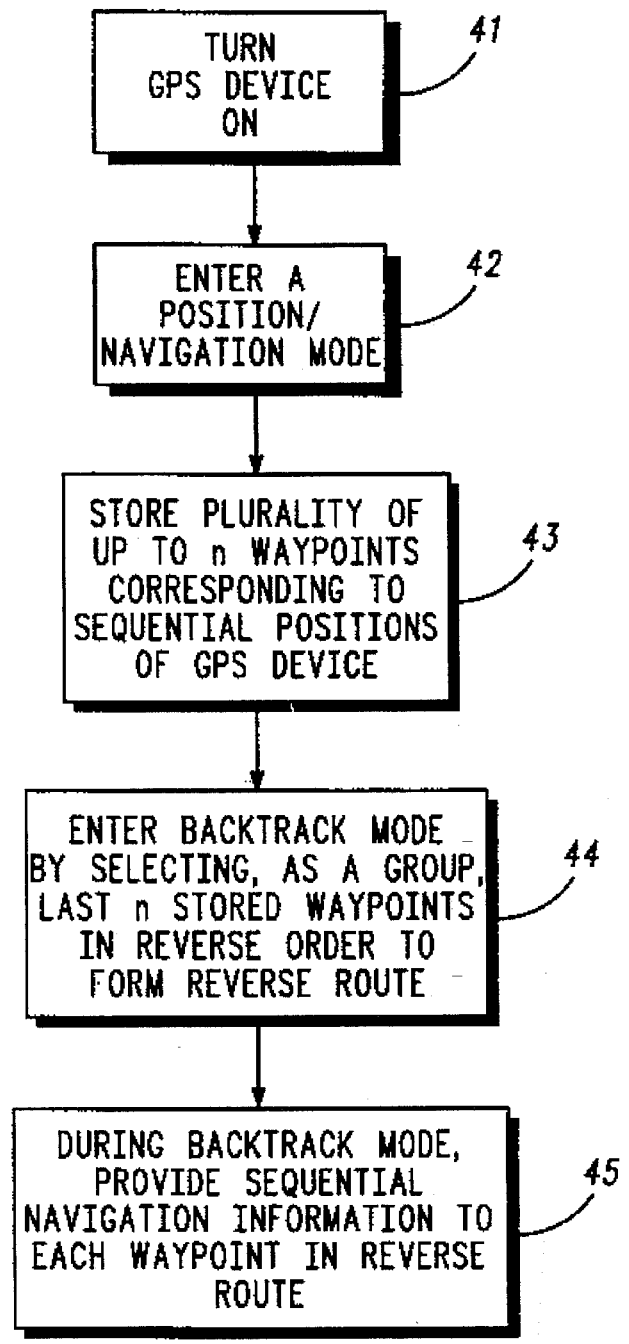
FIG.3 is a flowchart illustrating the operation of the position/navigation device illustrated in FIGS. 1 and 2.

Referring now to FIG.3, a flowchart 40 is illustrated therein. The flowchart commences with a process step 41 which implements turning on power to the device 10. This corresponds to actuation of the power switch 20 shown in FIG.2 wherein this switch is operated in a toggle manner so as to selectively turn on and turn off the position/navigation device 10.

After process block 41, a process block 42 is implemented which corresponds to the operator of the device 10 actuating manual controls so as to implement either a position or navigation mode during which position waypoints corresponding to the positions of the device 10 can be designated and stored. With regard to the specific device shown in FIG.2, this can be implemented by actuation of the pushbutton 25 immediately after turning power on to the device 10 since after turning on power an initial main menu designation for the labels 30–33 indicates that the label 30 of the display 24 will designate "position" and thereby implement a position mode by actuation of the manual control 25. In such a "position" mode waypoints may be stored by the device 10 wherein these waypoints can correspond to actual physical positions (locations) of the device 10. It should be noted that other position/navigation modes could also be implemented by the process block 42 as long as in any such a mode it is possible to store waypoints corresponding to the physical location of the device 10.

After process block 42, a process block 43 is implemented in which a plurality of up to n waypoints corresponding to ordered sequential positions of the device 10 are stored at least in the backtrack route memory 18. In order to store such waypoints, the manual control 21 is first actuated which results in providing at terminal 13 actual longitude and latitude information to the microprocessor 14 indicative of the longitude and latitude positions of the device 10. This information is derived from GPS position information provided by the GPS signal processor 12 which essentially corresponds to a receiver that receives GPS information from the antenna 11 and provides position information at the terminal 13. The microprocessor 14 may, if desired, control certain aspects of the GPS signal processor 12, and this is indicated by a direct connection between these components.

After actuation of the mark pushbutton 21, actuation of the nondedicated pushbutton 26 results in storing this information since the function label 31 will now read "store" for the function implemented by the pushbutton 26. Thus to store a waypoint corresponding to the position of the device 10, the device operator first hits the mark pushbutton 21 and then the store pushbutton 26. This sequence results in storing a waypoint, in the memory location 18, corresponding to the present longitude and latitude position of the device 10. When a device operator again sequentially actuates the pushbuttons 21 and 26 a second additional waypoint will be stored in the memory 18 and this procedure can be sequentially repeated up until a plurality of n waypoints are stored in the backtrack route memory 18. Thus, as a hiker or boat navigator is traversing unfamiliar territory with his position/navigation device 10, he can occasionally store an ordered sequence of position waypoints to indicate the route that he is travelling. The device operator may also want to designate the first of such stored waypoints as a home or beginning location and he also may want to store these waypoints in the general waypoint route memory storage location 17 so that he can selectively recall such waypoints in any order and create various other routes. However, regardless of these other operations, for every waypoint stored by the device 10, every one of these waypoints corresponding to the actual location of the device 10 will be automatically stored in the backtrack route memory 18 by the sequence of hitting the mark and store pushbuttons corresponding to the controls 21 and 26.

When the device operator desires to retrace his steps, control passes from the process block 43 to a subsequent process block 44 which is representative of the device operator entering a backtrack mode. The device operator selects the backtrack mode by, for example, hitting the "quit" manual pushbutton 23 until the initial main menu labels appear for the label spaces 30–33. At this time, the label designation 32 will read "route" and actuation of the pushbutton 27 indicates that a route selection mode is to be implemented. After actuation of this pushbutton, the labels 30–33 will now change and actuation of the pushbutton 26 will implement the desired backtrack mode while the label 31 indicates the legend "home". The bottom line is that sequential actuation of some of the manual controls will implement a desired backtrack mode to essentially direct the device operator along the previously stored waypoints indicative of a sequence of prior positions of the device 10 so that the device operator can arrive at the initial stored waypoint corresponding to the start or home location which will correspond to the first stored waypoint that was stored in the memory 18.

A key feature of the device 10 is that the reverse route to direct the device operator back along his previously traveled path is selected by selecting the ordered stored sequence of n waypoints as a group without designating any individual waypoints so as to form a route that is indicative of the prior position movement of the position/navigation device 10. This selected reverse route is created merely by reversing the order in which the n stored waypoints in the memory 18 were initially stored. Thus, for example, if the device operator stored a sequence of 5 waypoints as he travelled through unknown territories wherein these waypoints were sequentially designated as waypoints 1 through 5, the process block 44 will take the 5 stored waypoints residing in the memory 18 and designate all of them as a group as the desired route while reversing the order of these waypoints so that the waypoints will be arranged effectively as waypoints 5 through 1. It is this selection of waypoints as a group and their automatic effective reversal that simplifies the operation of the present position/navigation device and distinguishes it over prior devices which required individual designation of any stored waypoint in order to include that waypoint in a desired navigation route. Clearly if a prior art system would require the individual designating and recalling all five stored waypoints this would greatly inhibit the rapid backtracking of positions and require the device operator to recall the names and order in which the prior waypoints had been stored so that he could properly recall them and reverse their order. None of this required by the process block 44 which selects all of the waypoints in the backtrack route memory 18 as a group and then automatically effectively reverses their storage order to form a reverse route.

After the process block 44, control passes to a process block 45 which provides navigation information to the device operator so as to sequentially provide navigation information to each reverse route waypoint in the reverse route provided by the process block 44. Preferably the navigation information provided by the process block 45 comprises directional information, as well as preferably distance information, initially from the present position of the position/navigation device 10 to the position corresponding to the most recently stored one of the waypoints in the memory 18. Thus, for example, if there were 5 waypoints stored in the backtrack route memory 18, during the backtrack mode, the process block 45 would initially direct the device operator from the current position of the device 10 to the waypoint 5. After achieving the position of the waypoint 5 the process block 45 will either automatically or in response to actuation of manual controls by the device operator, then provide navigation information from the current position of the device 10 back to waypoint 4 and so on until the first stored waypoint is arrived at. Navigation direction/heading information can be provided by the device 10 by measuring and comparing sequential positions of the device 10 to determine the current direction of travel. This is conventional.

Essentially, the flowchart 40 implements the sequential storing of a plurality of waypoints corresponding to physical locations of the position/navigation device 10 as the device is located in each of the stored positions. These positions are stored as an ordered sequence of waypoints. When it is desired to backtrack along this same ordered sequence of a plurality of waypoints, a backtrack mode is entered which selects, as a group, all of the stored plurality of waypoints as forming the reverse route to be followed and then reverses the order in which these waypoints were stored so as to provide a reverse route. This greatly simplifies the number of keystrokes or manual actuations to be implemented for providing a reverse route function since each individual stored waypoint does not have to be individually designated when forming the reverse to be followed. Preferably, only a finite number of waypoints will be stored in the backtrack route memory 18 wherein this number of n stored waypoints is less than 31 and preferably equal to 10. By utilization of the present invention, a hiker or marine navigator can be assured of retracing his movements in accordance with stored waypoints without implementing an excessive number of manual actuations and without requiring him to remember which waypoints have been stored and in which order those waypoints have been stored. This is because the backtrack route memory 18 will store all of the waypoints, up to some maximum number, and the process block 44 will select all of these stored waypoints and reverse their order so as to readily provide a reverse route to enable the device operator to retrace his steps.

While the present embodiment has been described in terms of a position/navigation device, clearly the preceding description of the device 10 operation corresponds to a position/navigation method that differs from prior position/navigation methods. Also, while only the flowchart steps relating to establishing a backtrack route have been discussed, clearly the device 10 can implement other features, such as providing an altitude reading, as well as longitude and latitude, for the positions of the device 10.

While we have shown and described specific embodiments of the invention, further modifications and improvements will occur to those skilled in the art. Such modifications could comprise, for example, having timing or other circuitry implement the designation and storage of waypoints instead of actuation of the manual controls 21–23 and 25–28, or having circuitry automatically implement a reverse route designation and selection mode instead of providing this mode in response to actuation of manual controls. All such modifications which retain the basic underlying principles disclosed and claimed herein are within the scope of this invention.

We claim:

1. A position/navigation device comprising;

waypoint means for sequentially designating and storing a continuous ordered sequence of a plurality of n determined positions defining of said locations coordinate position/navigation device as said device is sequentially located in each of said positions, said sequence of positions stored as a continuous ordered sequence of n waypoints;

route and route reversal means for selecting said stored sequence of n waypoints, as a group without designating individual waypoints, to form a route indicative of prior position movement of said position/navigation device and for creating a reverse route by reversing the order of said n stored waypoints; and navigation means for providing navigation information for following said reverse route to each of said n wayponts.

2. A position/navigation device according to claim 1 wherein said waypoint means comprises a GPS receiver and said n waypoints are stored by said waypoint means as at least longitude and latitude positions for each of said n waypoints, said longitude and latitude positions corresponding to GPS position information provided by said GPS receiver.

3. A position/navigation device according to claim 2 wherein said waypoint means comprises a computer which implements a position/navigation mode during which said n waypoints are stored, said n waypoints corresponding to the last n designated and stored positions of said position/navigation device.

4. A position/navigation device according to claim 3 wherein said waypoint means includes waypoint manual control means actuation of which by an operator of said position/navigation device designates and stores each of said n waypoints corresponding to the position of said position/navigation device at the time of actuation of said waypoint manual control means.

5. A position/navigation device according to claim 4 wherein said route and route reversal means also includes route manual control means for implementing said route selection and route reversal functions in response to actuation of said route manual control means.

6. A position/navigation device according to claim 5 wherein said navigation means initially provides navigation information from a present position of the position/navigation device to the position of said position/navigation device corresponding to the most recently stored one of said n waypoints.

7. A position/navigation device according to claim 1 wherein said waypoint means includes manual control means for implementing storing of said waypoints in response to actuation of said manual control means when said position/navigation device is at each of said plurality of n positions.

8. A position/navigation device according to claim 1 wherein n is less than 30.

9. A position/navigation device according to claim 8 wherein n is equal to 10.

10. A position/navigation method comprising the steps of:

sequentially designating and storing a continuous coordinate ordered sequence of a plurality of n determined positions defining location of a position/navigation device as said device is sequentially located in each of said positions, said sequence of positions stored as a continuous ordered sequence of n waypoints;

selecting said stored sequence of n waypoints, as a group without designating individual waypoints, to form a route indicative of prior position movement of said position/navigation device and creating a reverse route by reversing the order of said n stored waypoints; and providing navigation information for following said reverse route to each of said n waypoints.

11. A position/navigation method according to claim 10 wherein said step of designating and storing said plurality of n positions is implemented by a GPS receiver and wherein said n waypoints are stored as at least longitude and latitude positions corresponding to each of said n waypoints wherein said longitude and latitude positions correspond to GPS position information provided by said GPS receiver.

12. A position/navigation method according to claim 11 wherein said step of designating and storing said continuous ordered sequence of n waypoints is implemented by a computer during a position/navigation mode for said computer, and wherein said n waypoints correspond to the last n designated and stored positions of said position/navigation device.

13. A position/navigation method according to claim 12 wherein said designating and storing step for said plurality of n positions is implemented by actuation of waypoint manual controls provided as part of said position/navigation device, and wherein said n waypoints correspond to the position of said position/navigation device, at the time of said actuation of said waypoint manual controls.

14. A position/navigation method according to claim 13 wherein said route selecting and route reversal step is implemented in response to actuation of manual controls.

15. A position/navigation method according to claim 14 wherein said providing navigation information step initially comprises providing navigation information from a present position of said position/navigation device to the position corresponding to the most recently stored one of said n waypoints.

16. A position/navigation method according to claim 10 wherein said step of sequentially designating and storing said n waypoints is implemented in response to manual control actuation when said position/navigation device is at each of said stored n positions.

17. A position/navigation method according to claim 16 wherein n is less than 30.

18. A position/navigation method according to claim 17 wherein n is equal to 10.

* * * * *

UNITED STATES PATENT AND TRADEMARK OFFICE
CERTIFICATE OF CORRECTION

PATENT NO. : 5,543,802
DATED : Aug. 6, 1996
INVENTOR(S) : Villevieille et al.

It is certified that error appears in the above-indentified patent and that said Letters Patent is hereby corrected as shown below:

In claim 1, col. 7, line 32, "position defining of said locations coordinate" should be --positions defining coordinate locations of said--.

In claim 10, col. 8, line 27, "defining location" should be --defining coordinate locations--.

Column 8, line 25, "coordinate" should be deleted.

Signed and Sealed this

Twenty-fifth Day of March, 1997

Attest:

BRUCE LEHMAN

Attesting Officer

Commissioner of Patents and Trademarks